Figure 1:
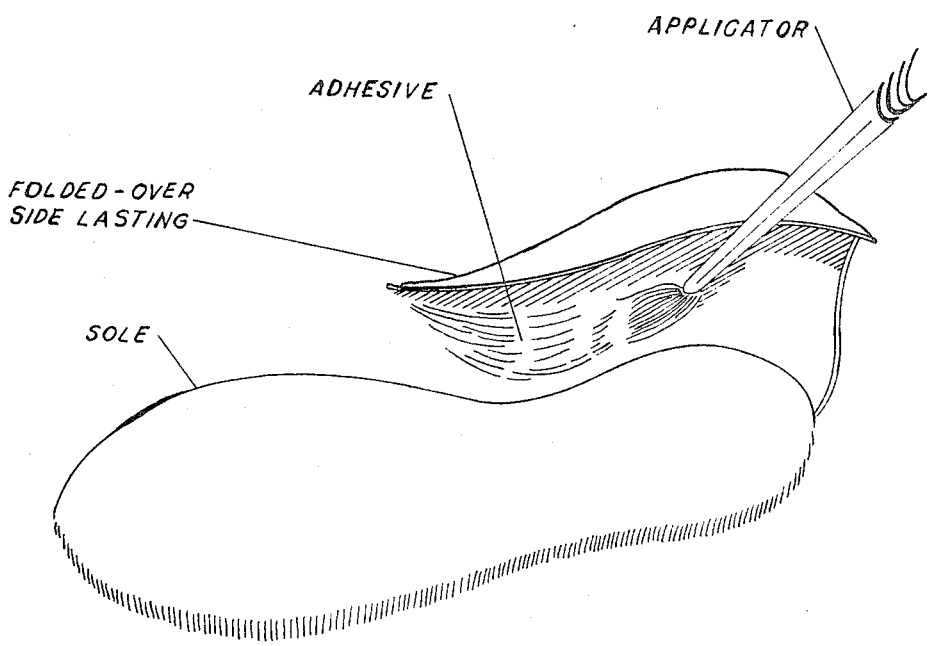

Nov. 1, 1966 J. W. LOWE ET AL 3,281,876
METHOD OF ASSEMBLING A SHOE UPPER
Filed May 28, 1963
2 Sheets-Sheet 1

FIG. I

JACK W. LOWE
GILLIAM S. TEAGUE, JR.
INVENTORS

BY R. Frank Smith
Abram W. Hatcher 3,281,876
METHOD OF ASSEMBLING A SHOE UPPER
Jack William Lowe and Gilliam Senn Teague, Jr., Kingsport, Tenn., assignors to Eastman Kodak Company, Rochester, N.Y., a corporation of New Jersey
Filed May 28, 1963, Ser. No. 283,731
2 Claims. (Cl. 12—146)

This invention involves adhesive compositions. More particularly it involves compositions adapted for topline cementing of shoes.

This application is a continuation-in-part of Serial No. 157,785, filed December 7, 1961, and now abandoned.

There is an operation in the shoe industry known as side lasting. In this operation the material forming the upper part of the shoe is overlapped on itself around the top of the foot opening and temporarily bonded until the bond can be stitched in place. The leather or other shoe upper material is bonded flesh to flesh. Although thermoplastic polyamide adhesives known to the art have proved useful in such a side lasting operation, difficulties may sometimes be experienced in sticking of the bond to the needle or in insufficient flexibility in the bond produced. Therefore it is apparent that development of a shoe lasting adhesive which will produce a flexible temporary bond and one which will not cause trouble in stitching by sticking to the needle represents a highly desirable object. After extended investigation we have found such a composition and one which is also more economical than those known to the prior art.

This invention has for one object to provide cellulosic adhesive compositions adapted for bonding the overlap portion at the top of the ankle portion of a shoe. A further object is to provide a heel section of a shoe with topline cemented with a cellulosic composition capable of bonding the flesh side of the leather to the inner lining of the shoe until it can be sewed in place. Other objects will appear hereinafter.

In the broader aspects, our invention involves cellulosic adhesive compositions adapted for bonding the topline or overlapping seam of the heel-ankle portion of shoes. This composition is made up of three or more constituents, viz., (1) one or more cellulosic materials such as cellulose acetate propionate, cellulose acetate butyrate, or ethyl cellulose, (2) one or more modifying thermoplastic resins such as polyvinyl acetate, alkyd resins, or the like, (3) at least one plasticizer sufficiently active to dissolve or soften the cellulose ester, for example dioctyl phthalate, dibutyl phthalate, triacetin, a neopentyl glycol polymeric plasticizer, or the like, and preferably (4) a heat stabilizer such as an epoxy compound, a phosphite, a non-metallic organic stabilizer, or the like. In addition the composition may contain minor amounts of an appropriate extender such as sucrose acetate isobutyrate (SAIB), a polymolecular plasticizer derived from α-methyl styrene, a glycerol monooleate, or the like. The composition may be applied either as a hot melt or as a lacquer. If applied as a lacquer, it would also contain an appropriate solvent. The hot melt is preferred, as by its use we eliminate the possibility of any residual solvent in the product. In either case the overlapped topline of the shoe last may be caused to seal against itself forming a seam line.

The cellulosic hot melt may be prepared as follows:

(1) The plasticizers, resins, and other additives are placed in a melting kettle and brought to a temperature of 350° F.
(2) The cellulose polymer is then added slowly, with good agitation, the heat being adjusted to compensate for the cooling of the mixture caused by this addition.
(3) Maintain the melt under good agitation at this elevated temperature from 30–60 minutes until complete solution is obtained. After a homogeneous melt is obtained, it is ready for application.

The melt may be applied in any suitable manner, for example by a hot pickup roll or by a wick if the lacquer is used. It should be heated to at least 350° F. before application. In the case of the hot pickup roll, the roll dips into the melt as it rotates. A doctor blade may be used to meter the coating onto the surface to be coated, and a smoothing bar to produce a uniform coating weight.

The coating may also be applied as a solid stick of thermoplastic adhesive from an automatic feeding reservoir. A special heating element in this case melts the adhesive to a fluid state. The temperature required for bonding the shoe last seam is from about 350° F. to about 400° F. The temperature should not exceed the 400° F. upper limit, since the excessive heat would tend to cause decomposition of the sealing composition and thus cause poor adhesion.

One of the unexpected features of our invention is the fact that our coating compositions will not decompose so as to cause a poor bond or seal when the heat is applied in a heat sealing operation.

When the adhesive composition is applied as a lacquer, the solvent is an appropriate liquid, for example, a volatile organic solvent such as toluene or benzene used in conjunction with an ethyl or other alcohol, for instance.

The ingredients of the adhesive composition of our invention should be held within the following limiting proportions. Weight percent (wt. percent) as used herein refers to the percent weight of an ingredient based on the total weight of the composition.

| Ingredients | Range | | Optimum | |
|---|---|---|---|---|
| | Parts by Wt. | Wt. Percent | Parts by Wt. | Wt. Percent |
| Cellulose Polymer | 30–70 | 10–80 | 40–60 | 20–60 |
| Modifying Resins | 10–40 | 3–50 | 12–35 | 5–38 |
| Active Plasticizers | 5–45 | 2–55 | 5–30 | 2–34 |
| Stabilizers | 0–2 | 0–4.5 | 0–1.5 | 0–2 |
| Extender Resins | 0–40 | 0–45 | 10–30 | 5–35 |
| Solvents | 0–90 | 0–67 | 0–80 | 0–56 |

When our adhesive is applied in the form of a hot melt, it should be maintained at fairly consistent temperatures of from about 325–375° F. during the coating application. Solidification occurs at temperatures below about 300° F. This approximate temperature range is critical, since if the melt temperature is too low, the cellulosic ingredient will begin to solidify, resulting in a rapid increase of melt viscosity. Conversely, if the temperature is too high, a volatilization of plasticizers and resins will occur and a viscosity buildup will result. In either case, the desired adherence of the shoe last seam will be unsatisfactory if the hot melt application temperature is substantially outside of this 325-375° F. range.

Under prolonged heating of a cellulosic hot melt at high temperatures, there may occur a gradual deterioration of the plasticizers and cellulose polymer. Such a deterioration may be detected by odor, decrease in viscosity of the melt, increase in color of the melt, and loss of tensile strength and elongation of the melt. To minimize this tendency a small amount of heat stabilizer may be incorporated into the hot melt formula, e.g., 0.1 to 0.5, or even as high as 2.0 weight percent. Any effective stabilizer may be used. However, a non-metallic organic auxiliary stabilizer has been found to work especially well with cellulose acetate butyrate and cellulose acetate propionate, which are preferred cellulose polymers or cellulosic materials. Surprisingly, cellulose acetate has proved unsatisfactory in obtaining the desired temporary shoe lasting bond. A properly stabilized cellulosic hot melt will remain stable for about 3 days, provided the temperature of the melt is kept below 375° F. Ethyl cellulose hot melts should be kept below 275° F.

Any variation in application method is permissible as long as a satisfactory coating is applied. The adhesive may also be applied in a discontinuous phase, for example, in ladder like and dotted patterns. Our work did not evidence that any required coating thickness was necessary to achieve satisfactory adhesive properties. In most instances, however, we applied the adhesive to a thickness of ½ to 1½ mils.

For a further understanding of our invention, reference may be made to the attached drawing forming a part of the present application.

FIG. 1 is a schematic representation of the step of applying the cellulosic composition to the top line in a shoe lasting operation in which the actual side portion of the shoe folds over itself at the top. In this embodiment the leather or other material from which the shoe is made is bonded flesh to flesh by overlapping.

Figure 2:
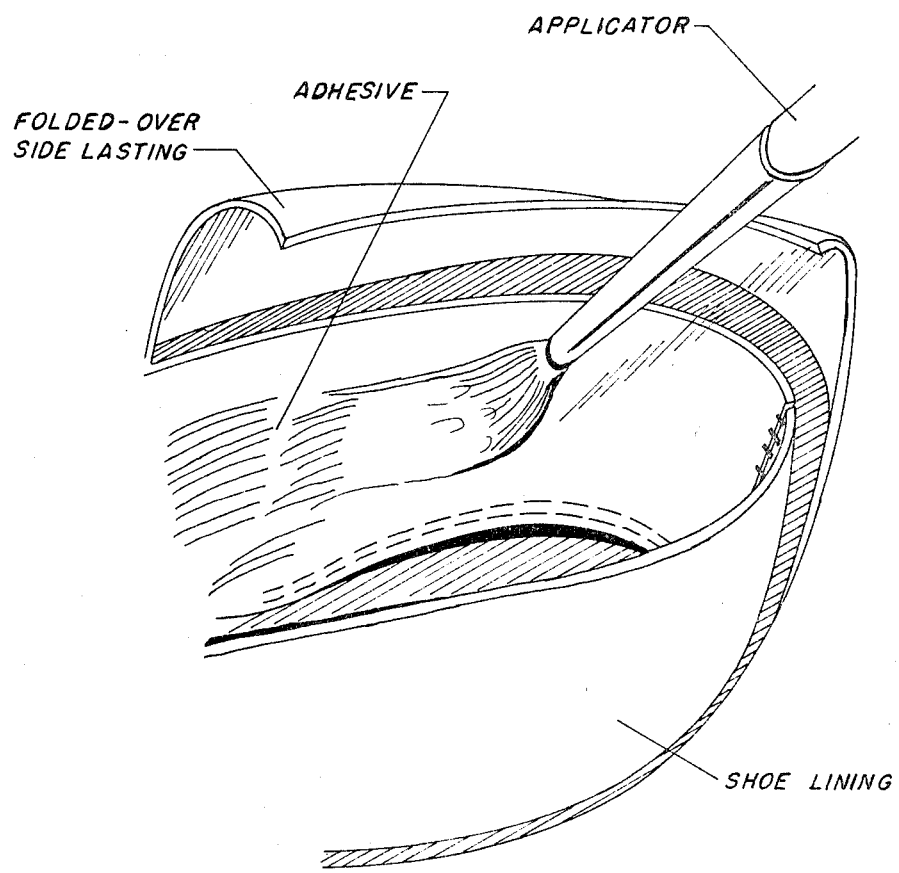

FIG. 2 is a schematic representation of a shoe lasting coated at the top line portion with the cellulosic composition according to another embodiment of this invention wherein an outer layer folds over an inner lining to make a double overlapped portion folded over the top of the shoe. In this embodiment the flesh side of the leather or other shoe construction material is bonded by the adhesive to an inner lining of the shoe.

In the following examples are described several embodiments of our invention. These are illustrations of the invention and should not be construed to unduly limit the invention.

EXAMPLE I

The following hot melt formulations based on cellulosic polymers were used as topline adhesives.

*Sample A*

| Ingredients: | Weight percent |
|---|---|
| Cellulose acetate butyrate (13% acetyl, 37% butyryl) | 55 |
| NP-10 [1] plasticizer | 25 |
| 276-V9 [2] extender resin | 14.5 |
| AYAC [3] polyvinyl acetate modifying resin | 5 |
| Advastab CH-201 [4] stabilizer | 0.5 |

*Sample B*

Ingredients:
| | |
|---|---|
| Cellulose acetate propionate (3% acetyl, 46% propionyl) | 50 |
| SAIB [5] extender resin | 18.5 |
| AYAC [3] polyvinyl acetate modifying resin | 15 |
| Dioctyl phthalate plasticizer | 15 |
| GMO [6] extender resin | 1 |
| Advastab CH-201 [4] stabilizer | 0.5 |

*Sample C*

Ingredients:
| | |
|---|---|
| Ethyl cellulose | 30 |
| Staybelite ester 10 [7] modifying resin | 24 |
| Dioctyl phthalate plasticizer | 9.5 |
| SAIB [5] | 16 |
| AYAC [3] polyvinyl acetate modifying resin | 20 |
| Advastab CH-201 [4] stabilizer | 0.5 |

*Sample D*

Ingredients:
| | |
|---|---|
| Cellulose acetate butyrate (6% acetyl, 48% butyryl) | 20 |
| AYAC [3] polyvinyl acetate modifying resin | 2.5 |
| Petrex 7-75T [8] (75%) modifying resin | 10 |
| 276-V9 [2] extender resin | 10 |
| Dioctyl phthalate plasticizer | 2 |
| Solvent— | |
| Toluene | 40.5 |
| Ethyl alcohol, 95% | 12 |
| Nitropropane-1 | 3 |

[1] A neopentyl glycol polymeric plasticizer product of Eastman Chemical Products, Inc.
[2] A polymolecular plasticizer derived from alpha-methyl styrene.
[3] A polyvinyl acetate, viscosity 1.5 cps., manufactured by Bakelite Division of Union Carbide and Carbon Company.
[4] A non-metallic organic polymeric phosphite auxiliary stabilizer manufactured by Advance Solvents, Inc.
[5] Sucrose acetate isobutyrate.
[6] A glycerol monooleate manufactured by Distillation Products, Inc.
[7] A glycerol ester of hydrogenated rosin manufactured by Hercules Powder Co.
[8] A diethylene glycol ester of Petrex acid manufactured by Hercules Powder Co.

EXAMPLE II

The following hot melt formulation was applied in a shoe side lasting operation such as described hereinabove in a manner such as depicted in FIG. 1.

| | Weight parts |
|---|---|
| Cellulose acetate propionate | 45 |
| Dioctyl phthalate | 20 |
| SAIB | 20 |
| Polyvinyl acetate resin | 14.5 |
| Stabilizer | 0.5 |

The melt was applied from an automatic feeding reservoir as a solid stick of thermoplastic adhesive. A heating element at the base of the applicator melted the adhesive to a fluid state by heating it to about 350° F. A good bond was formed. The overlapped side lasting was later stitched in place without the bond sticking to the needle. Flexibility of the bond permitted a neat upper seam or topline to be formed.

It should be apparent from the above description and examples that we have provided a novel cellulosic shoe side lasting adhesive composition which provides a good cemented topline adapted for stitching in place to form a smooth permanent seam.

Although the invention has been described in considerable detail with particular reference to certain preferred embodiments thereof, variations and modifications can be effected within the spirit and scope of the invention as described hereinabove, and as defined in the appended claims.

We claim:

1. A shoemaking process comprising the steps of coating the topline portion of the inner surface of the rear portion of the upper with a hot melt adhesive composition comprising (1) a cellulosic material selected from the group consisting of cellulose acetate propionate, cellulose acetate butyrate and ethyl cellulose, (2) a polyvinyl thermoplastic resin and (3) an active plasticizer, folding over said coated topline portion to form an overlapping topline seam; and maintaining a temperature of at least about 325° F. thereby temporarily bonding said overlapping topline seam and permitting stitching of the same into a permanent side last upper seam.

2. The process according to claim 1 wherein the melt is applied from an automatic feeding reservoir as a solid stick of thermoplastic adhesive by heating to a temperature of about 350° F. at the point of application and the temperature is maintained at said temperature of about 350° F. until heat sealing of the adhesive.

References Cited by the Examiner
UNITED STATES PATENTS

| | | | |
|---|---|---|---|
| Re. 21,267 | 11/1939 | Thurston | 12—146 |
| 2,931,802 | 4/1960 | Touey et al. | 260—234 |
| 3,029,450 | 4/1962 | Griswold | 12—146 |

OTHER REFERENCES

Gearhart et al., "Half-Second Cellulose Acetate Butyrate: II," Official Digest, Federation of Paint and Varnish Production Clubs, April 1954, pages 255–265.

JORDAN FRANKLIN, *Primary Examiner.*

H. H. HUNTER, *Assistant Examiner.*